United States Patent
Nakagawa

(10) Patent No.: US 9,405,980 B2
(45) Date of Patent: Aug. 2, 2016

(54) ARROW SIGNAL RECOGNITION DEVICE

(71) Applicant: FUJI JUKOGYO KABUSHIKI KAISHA, Tokyo (JP)

(72) Inventor: Ryo Nakagawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 14/579,779

(22) Filed: Dec. 22, 2014

(65) Prior Publication Data

US 2015/0186734 A1 Jul. 2, 2015

(30) Foreign Application Priority Data

Dec. 27, 2013 (JP) .................. 2013-271587

(51) Int. Cl.
G06K 9/00 (2006.01)
G06K 9/46 (2006.01)

(52) U.S. Cl.
CPC ........ G06K 9/00791 (2013.01); G06K 9/00825 (2013.01); G06K 9/4652 (2013.01)

(58) Field of Classification Search
CPC .......... G06K 9/00791; G06K 9/00825; G06K 9/4652; G06T 2207/10024; G06T 2207/30252
See application file for complete search history.

(56) References Cited

U.S. PATENT DOCUMENTS

2012/0288150 A1* 11/2012 Kido .............................. 382/103
2015/0210312 A1* 7/2015 Stein et al. ............... B62D 6/00
701/41

FOREIGN PATENT DOCUMENTS

| JP | 03-182192 A | 8/1991 |
| JP | 07-004210 U | 1/1995 |
| JP | 2009-043068 A | 2/2009 |
| JP | 2012-168592 A | 9/2012 |
| JP | 2012-238244 A | 12/2012 |

* cited by examiner

*Primary Examiner* — Andrew W Johns
(74) *Attorney, Agent, or Firm* — McDermott Will & Emery LLP

(57) ABSTRACT

Based on an image captured by an onboard camera, an arrow signal detector sets an arrow signal area on the basis of a signal light distance between a lit red signal light of a traffic light and a vehicle equipped with the arrow signal recognition device, counts the number of color tone effective pixels assumed as being lit within each arrow signal area, further searches for and counts color tone ineffective pixels in the color tone effective pixels on the basis of pixel information on the vicinity of each color tone effective pixel, and calculates an arrow effective pixel number from the difference between the number of color tone effective pixels and the number of color tone ineffective pixels.

11 Claims, 9 Drawing Sheets

FIG. 9A

| NG | G=30 | NG |
|---|---|---|
| G=40 | G=50 | G=50 |
| NG | G=51 | NG |

FIG. 9B

| NG | NG | NG |
|---|---|---|
| NG | COLOR TONE EFFECTIVE PIXEL | NG |
| NG | NG | NG |

ARROW SIGNAL RECOGNITION DEVICE

CROSS-REFERENCE TO RELATED APPLICATIONS

The present application claims priority from Japanese Patent Application No. 2013-271587 filed on Dec. 27, 2013, the entire contents of which are hereby incorporated by reference.

BACKGROUND

1. Technical Field

The present invention relates to an arrow signal recognition device that recognizes an arrow signal light provided to a traffic light, on the basis of an image captured by an onboard camera.

2. Related Art

Conventionally, a technique is known in which a traffic light and an arrow signal light provided to the traffic light are recognized based on a driving environment ahead of a vehicle that is image-captured by a camera (hereinafter referred to as "onboard camera") mounted to the vehicle.

For example, Japanese Unexamined Patent Application Publication No. 2012-168592 discloses a technique of extracting an arrow signal light by detecting a red signal of a traffic light based on an image captured by an onboard camera and setting a search region for the arrow signal light based on the position of the red signal within the image to detect a pixel having a color feature amount of a predetermined RGB ratio within the set search region.

As traffic lights, there are light bulb traffic lights and LED traffic lights. Obviously, there are a light bulb type and an LED type in arrow signal lights as well. In an LED arrow signal light, an arrow is formed by LEDs being arranged at predetermined intervals. Therefore, the luminance is approximately constant throughout. However, in a light bulb traffic light, the luminance gradually decreases away from a light bulb, since a cover lens is colored in the color of light with a blue filter or the like. Further, the brightness of the light bulb itself is not constant.

As a result, in the case where extraction of an arrow signal light is performed with a threshold being a color feature amount of a predetermined RGB ratio as disclosed in the document mentioned above, recognition itself of the arrow signal light may be difficult from afar where a vehicle equipped with this technique is relatively distant from a traffic light, for example. As a solution, it is conceivable to set a low color feature amount. However, there is a problem that the precision of recognition of an arrow signal light decreases.

SUMMARY OF THE INVENTION

In view of the circumstances described above, an object of the present invention is to provide an arrow signal recognition device that can detect an arrow signal light with high precision even from relatively afar.

An aspect of the present invention provides an arrow signal recognition device including: an onboard camera that captures an image of a driving environment ahead of a vehicle equipped with the arrow signal recognition device; an image recognition processor that recognizes a lit signal light provided to a traffic light and calculates a signal light distance between the lit signal light and the vehicle, on the basis of one frame of the image captured by the onboard camera; and an arrow signal detector that detects an arrow signal light provided to the traffic light. The arrow signal detector includes: an arrow signal area setting module that sets an arrow signal area with reference to the lit signal light on the basis of the signal light distance; a color tone effective pixel searching module that searches for a color tone effective pixel assumed as being lit from a color tone within an arrow signal area set by the arrow signal area setting module and counts the number of the color tone effective pixels; a color tone ineffective pixel searching module that compares each color tone effective pixel retrieved by the color tone effective pixel searching module and a pixel in a vicinity of the color tone effective pixel and then searches the color tone effective pixel for a color tone ineffective pixel and moreover counts the number of the color tone ineffective pixels; an arrow effective pixel number calculating module that calculates an arrow effective pixel number by subtracting the number of color tone ineffective pixels retrieved by the color tone ineffective pixel searching module from the number of color tone effective pixels retrieved by the color tone effective pixel searching module; and an arrow pixel determining module that determines an arrow pixel to be present in a case where the arrow effective pixel number calculated by the arrow effective pixel number calculating module exceeds an arrow effective pixel threshold set based on the signal light distance.

BRIEF DESCRIPTION OF THE DRAWINGS

FIG. 9A is an illustration in which ineffective pixels are extracted from extracted arrow effective pixels based on the G edge difference relative to pixels in the vicinity, and FIG. 9B is an illustration in which an ineffective pixel is extracted from an extracted arrow effective pixel based on pixels in the vicinity.

DETAILED DESCRIPTION

Figure 1:
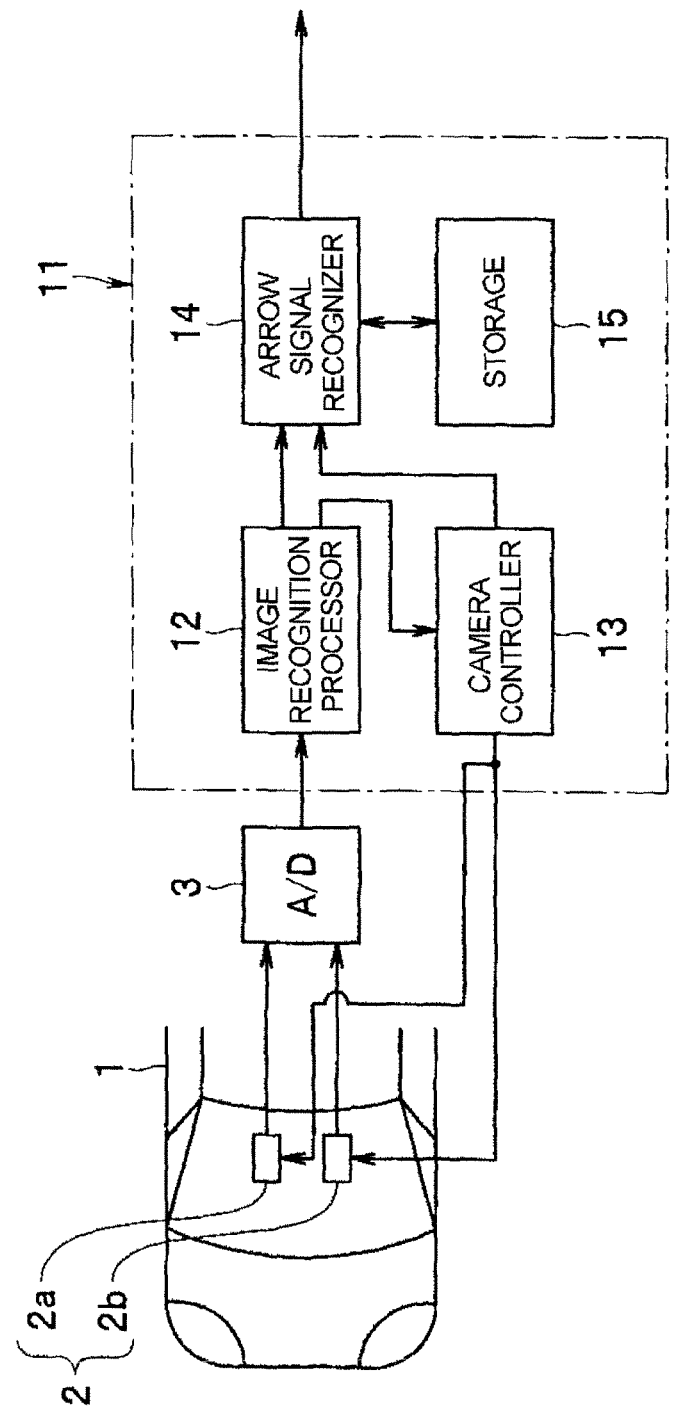
FIG. 1 is a schematic configuration diagram of an arrow signal recognition device.

One example of the present invention will be described below with reference to the drawings. Reference numeral 1 in FIG. 1 denotes a vehicle such as an automobile. In a front portion in the interior of the vehicle 1, an onboard camera 2 is placed in an upper portion of a front windshield. The onboard camera 2 is a stereo camera formed of a main camera 2a and a sub camera 2b. The respective cameras 2a and 2b are built in with an imaging element (image sensor) such as a CCD or CMOS and are arranged, for example, in symmetrical positions on the left and right across a rear-view mirror arranged in the middle in the vehicle width direction. Hereinafter, the onboard camera 2 refers to both the main camera 2a and the sub camera 2b for the sake of convenience, unless otherwise stated.

The onboard camera 2 is a color camera that captures a color image of a driving environment of a path on which the vehicle 1 is travelling. Pixel data of each imaging element is set with a luminance value (pixel value) of 8 bits (tone from 0 to 255) for each of R, G, and B. The luminance value is not limited to that of 8 bits.

The main camera 2a captures a reference image (right image) necessary upon performing stereo processing, and the sub camera 2b captures a comparison image (left image) for the processing. In a state of being synchronized with each other, respective analog images of R, G, and B output from the two cameras 2a and 2b are converted to a digital image of a predetermined tone by an A/D converter 3. The digitally converted image is output to an image recognition unit 11.

The image recognition unit 11 is mainly configured of a microcomputer and includes a known CPU, ROM, RAM, and the like. For an arrow signal recognition function processed in the CPU, an image recognition processor 12, a camera controller 13, and an arrow signal recognizer 14 serving as the arrow signal detector of the present invention are included. Further, the image recognition unit 11 includes a storage 15. The storage 15 stores respective pieces of data such values of as an arrow effective pixel number YOK detected for every arrow signal area described later, an arrow effective point PNiOK and an arrow ineffective point PNiNG of which one is updated for every frame, and an arrow signal light determination flag FNi set for every arrow signal area.

Figure 4:
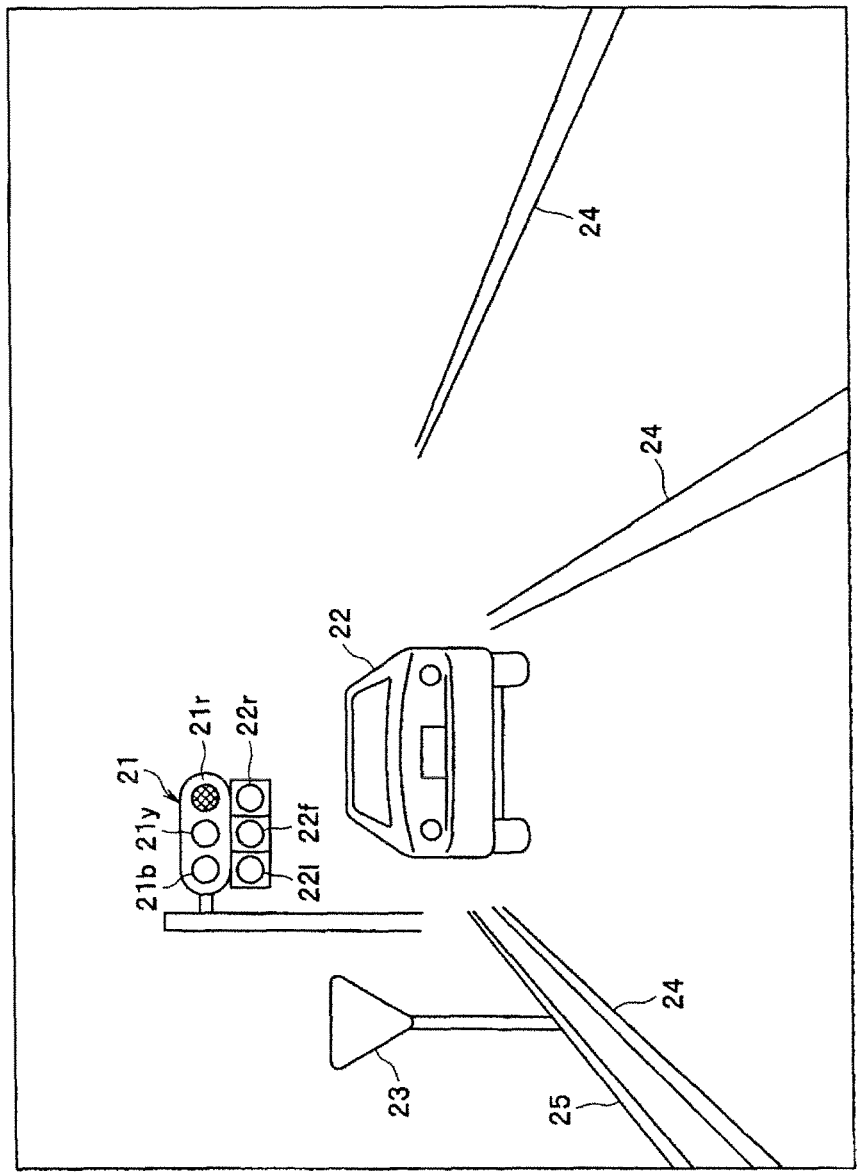
FIG. 4 is an illustration showing an image of a view ahead of a vehicle equipped with the an arrow signal recognition device that is captured by an onboard camera.

The image recognition processor 12 recognizes a three-dimensional object ahead of the vehicle 1 and calculates an average luminance value, based on image data captured by the onboard camera 2. That is, as shown in FIG. 4 for example, a preceding car 22, a traffic sign 23, a white line 24, a curb 25, as well as an oncoming car, pedestrian, or the like that is not shown are three-dimensional objects other than a traffic light 21 in image data captured by the onboard camera 2. These are recognized as respective three-dimensional objects, and the distances between these and the vehicle 1 are obtained from parallax in the main camera 2a and the sub camera 2b. Recognition of the respective three-dimensional objects is performed using a known pattern matching method or the like. How the distance between a three-dimensional object and the vehicle 1 is obtained is known, and therefore description is omitted.

In the image shown in FIG. 4, the traffic light 21 includes a red signal light 21r, a yellow signal light 21y, and a green signal light 21b. Further, below the respective signal lights, respective arrow signal lights 22r, 22f, and 22l for right turn, straight, and left turn are provided. Due to installation in accordance with the road situation, only one or two of the respective arrow signal lights 22r, 22f, and 22l may be installed.

The camera controller 13 reads the average luminance value of the image data processed in the image recognition processor 12, sets the exposure time (shutter speed) for the optimum brightness in capturing an image of the next frame, and performs exposure control of the respective cameras 2a and 2b based on the exposure time. The exposure time is read also by the arrow signal recognizer 14.

The arrow signal recognizer 14 checks whether or not lighting of the red signal light 21r of the traffic light 21 is detected based on the image data processed in the image recognition processor 12 and, in the case where lighting is detected, checks whether or not an arrow signal is provided to the traffic light.

Figure 2:
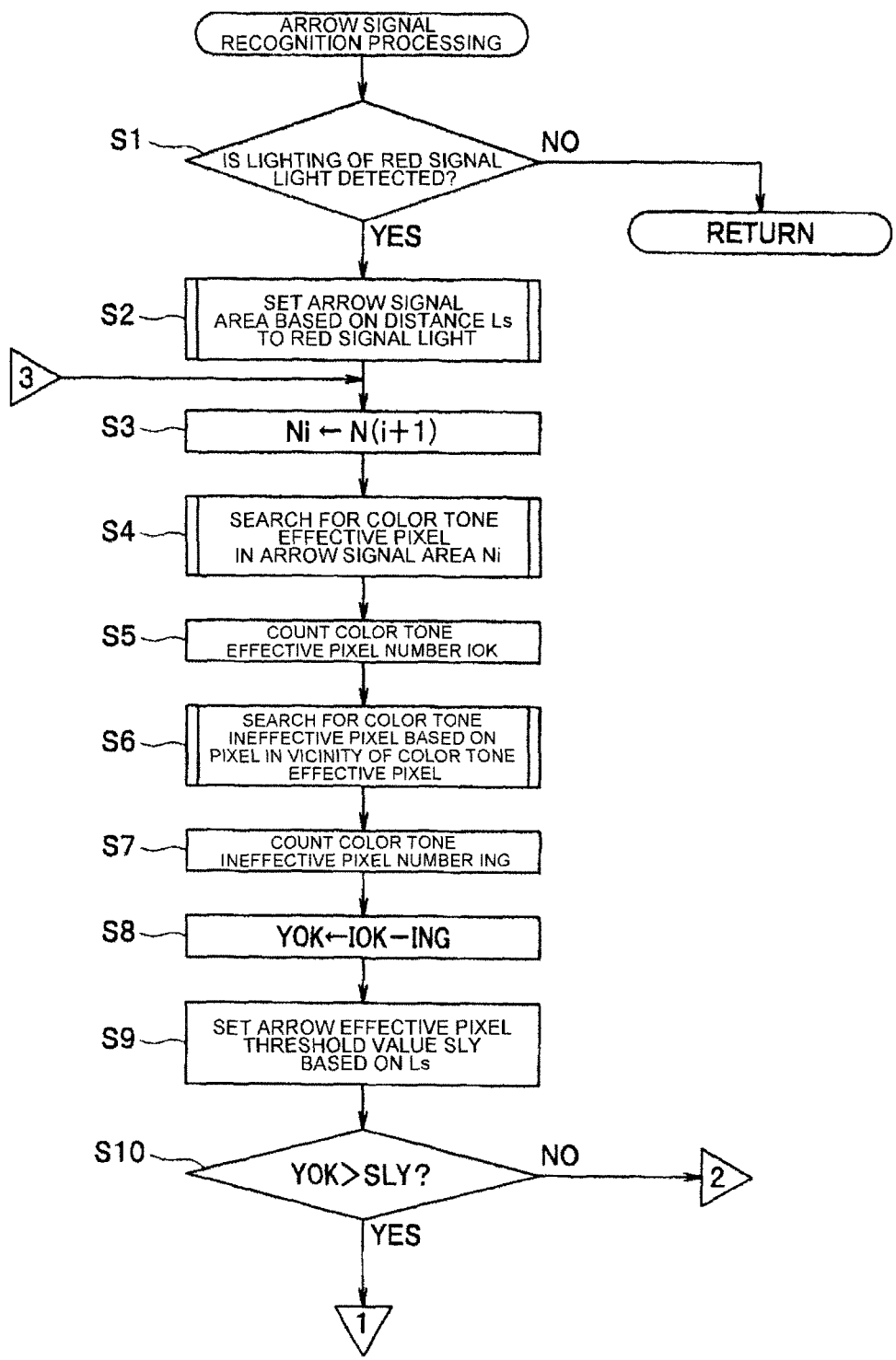
FIG. 2 is a first flowchart showing an arrow signal recognition processing routine.
Figure 3:
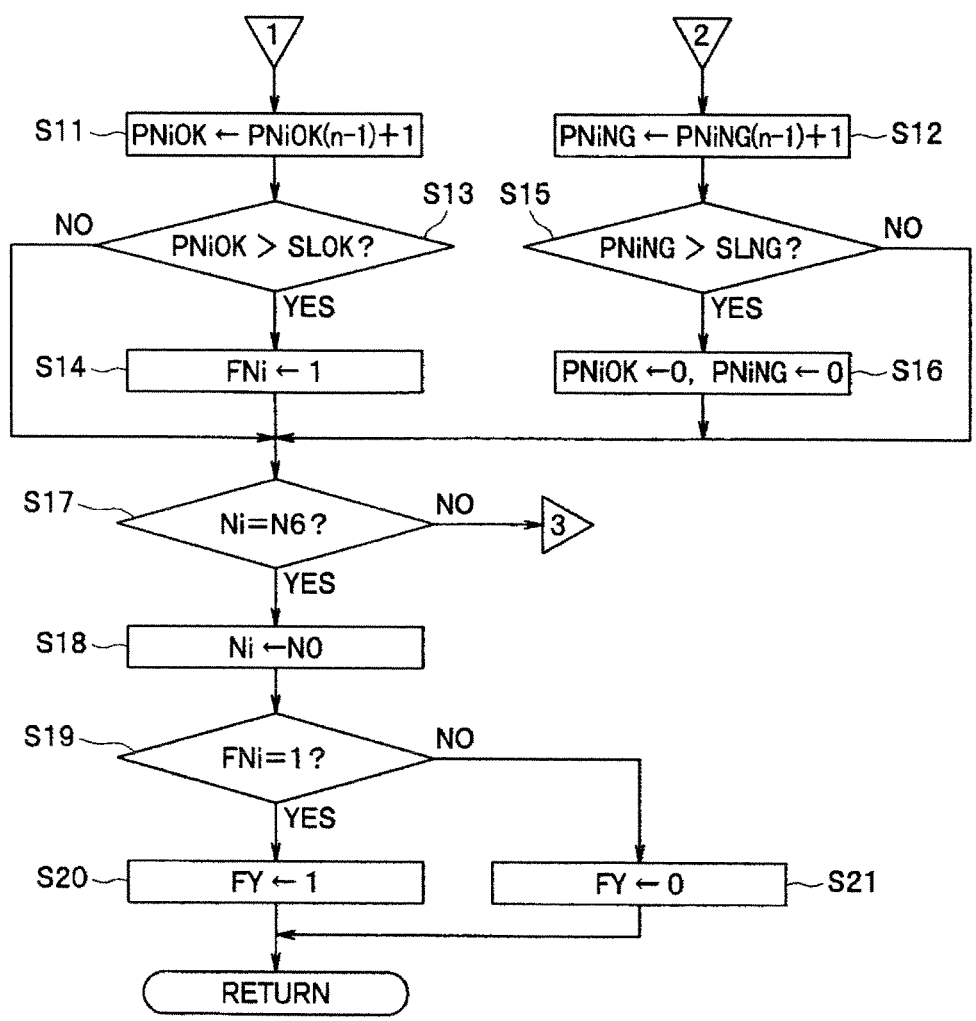
FIG. 3 is a second flowchart showing the arrow signal recognition processing routine.

Arrow signal recognition processing executed by the arrow signal recognizer 14 is specifically processed according to an arrow signal recognition processing routine shown in FIGS. 2 and 3.

The routine is initiated in synchronization with image information for every frame transmitted from the image recognition processor 12. First, in step S1, whether or not lighting of the red signal light 21r of the traffic light 21 is detected is checked. In the case where lighting is detected, the routine proceeds to step S2. In the case where lighting is not detected, the routine is exited to prepare for detection of lighting of the red signal light 21r in the next frame.

Figure 5:
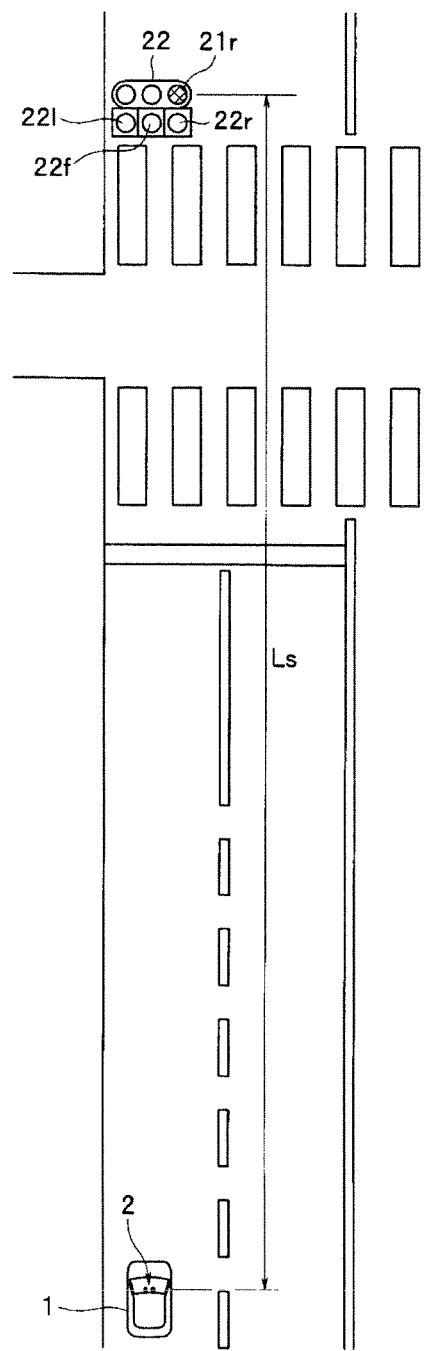
FIG. 5 is an illustration showing the positional relationship of a traffic light and the vehicle.

The size (diameter) of the respective signal lights 21r, 21y, and 21b is given in advance. Thus, if the distance (signal light distance) Ls from the vehicle 1 to the red signal light 21r and the actual diameter of the red signal light 21r are figured out as shown in FIG. 5, the signal light can be recognized by pattern matching of an image formed in the main camera 2a and a template of the signal light set in advance. Further, based on the color feature amount (predetermined RGB ratio) or luminance of the red signal light 21r, the signal light being lit, i.e., the red signal light 21r that is the lit signal light, can be recognized.

When it is determined that the red signal light 21r being lit is detected and the routine proceeds to step S2, arrow signal areas N1 to N6 are set based on the signal light distance Ls, and the routine proceeds to step S3. The processing in step S2 corresponds to processing by the arrow signal area setting module of the present invention.

Figure 7A:
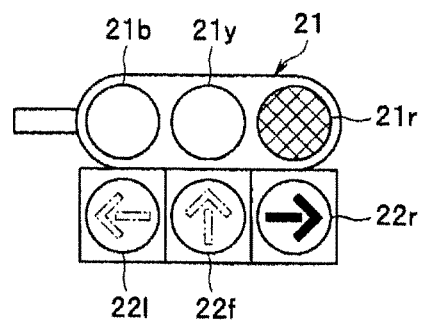
FIG. 7A is an illustration of a state where an arrow signal light is provided to a horizontal traffic light.
Figure 7B:
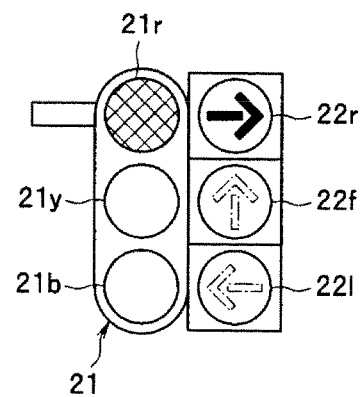
FIG. 7B is an illustration of a state where an arrow signal light is provided to a vertical traffic light.

For the traffic light 21, there is a vertical type shown in FIG. 7B, other than a horizontal type shown in FIG. 7A. In the horizontal traffic light 21, the arrow signal lights 22r, 22f, and 22l are provided below the red signal light 21r. In the vertical traffic light 21, the arrow signal lights 22r, 22f, and 22l are provided on the right side of the red signal light 21r when seen from the front. Thus, in correspondence with the arrangements of the arrow signal lights 22r, 22f, and 22l, the arrow signal areas N1 to N6 are set below and on the right side, when seen from the front, of the red signal light 21r. In this case, the size (diameter) of the arrow signal light is approximately the same as the red signal light 21r, and the approximate interval of the respective arrow signal lights 22r, 22f, and 22l are given. Further, the respective arrow signal lights 22r, 22f, and 22l are provided in positions apart by a distance given in advance from the corresponding signal lights 21r, 21y, and 21b.

Figure 6:
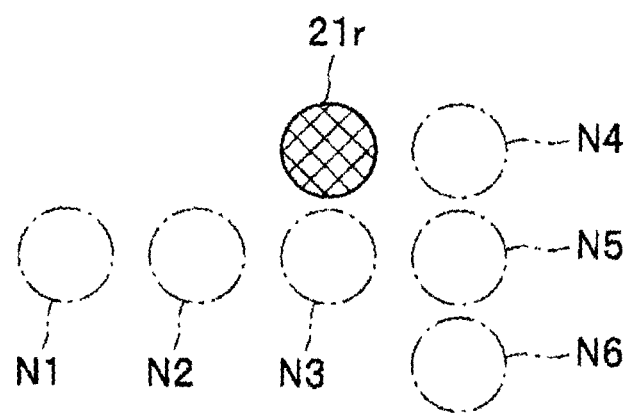
FIG. 6 is an illustration showing a search region for an arrow signal light that is set with reference to a red signal light.

Thus, based on the distance from the vehicle 1 to the red signal light 21r, the actual diameter of the red signal light 21r, the interval of the respective arrow signal lights 22r, 22f, and 22l, and the provided position of the arrow signal lights 22r, 22f, and 22l with reference to the respective signal lights 21r, 21y, and 21b, the actual distance per pixel pitch on an imaging surface of the main camera 2a is calculated, and the respective arrow signal areas N1 to N6 are set with reference to the red signal light 21r (see FIG. 6).

Then, the routine proceeds to step S3 and, steps S3 to S17 are repeated to check whether or not an arrow signal light is present in any one of the respective arrow signal areas N1 to N6. First, in step S3, an arrow signal area Ni is set. The initial value of the arrow signal area Ni is 0 and is incremented every time the routine is repeated (Ni←N(i+1) where i equals 1 to 6). Thus, in this example, search is first started from the arrow signal area N1 at the left end, and the next arrow signal area N2 and the arrow signal area N3 are searched in order, as shown in FIG. 6. The arrow signal areas N1 to N3 correspond to the respective arrow signal lights 22l, 22f, and 22r arranged in the horizontal traffic light 21 shown in FIG. 7A.

Next, the arrow signal area N4 on the immediate right of the detected red signal light 21r when seen from the front is searched, and the arrow signal area N5 and the arrow signal area N6 below are searched in order. The arrow signal areas N4 to N6 correspond to the respective arrow signal lights 22r, 22f, and 22l arranged in the vertical traffic light 21 shown in FIG. 7B.

Then, when the routine proceeds to step S4, pixels in the set arrow signal area Ni (e.g., area N1) are searched to extract a color tone effective pixel. That is, in the case where the arrow signal light is LED, the luminance is approximately constant in a lit state, and the edge is detected clearly. Therefore, the color feature amount of the arrow signal is large, and thus most of the color tone effective pixels can be set directly as arrow effective pixels. The color feature amount is an image feature amount relating to color information and is represented by pixel values of respective R, G, and B components of a pixel in question.

In this example, the reference for determining the magnitude of the color feature amount is set as follows.

$$G > 150$$

$$B > 0.6G$$

$$R < 0.5G$$

A pixel in which the pixel value is exceeded is determined as having a large color feature amount.

The color tone effective pixel refers to a pixel of which the pixel value is smaller than the color feature amount described above but that can be assumed as being lit from the color tone (tint or shade). In this example, that satisfying two conditions described below is extracted as the color tone effective pixel. The arrow effective pixel number described later refers to the remaining number of pixels when the number of pixels (color tone ineffective pixels) that have been temporarily assumed a as color tone effective pixel but become ineffective in relation to luminance information or the like of the vicinity is subtracted from the color tone effective pixel number. Thus, in the case of an LED arrow signal light, the color tone effective pixel number approximately equals the arrow effective pixel number, since there are very few color tone ineffective pixels.

The determination conditions for assuming a color tone effective pixel are as follows.
(1) The distance from the vehicle 1 to the arrow signal light is the same as the signal light distance Ls.
(2) The RGB ratio satisfies a predetermined condition with reference to luminance information of the vicinity.

The condition of (1) is to confirm provision to the same traffic light 21. The condition of (2) is to determine whether or not an arrow signal light, e.g., a light bulb arrow signal light with low luminance and a blurry outline, is lit. Specifically, when the red signal light 21r is lit, each pixel within each arrow signal area Ni is searched with the comparison reference being the luminance information (RGB ratio) of the signal light (e.g., yellow signal light 21y) that is unlit in the same traffic light 21. That is, since the lit arrow signal light is considered to be brighter than at least the unlit signal light (e.g., yellow signal light 21y), a pixel of which the detected luminance is brighter than the luminance information of the unlit signal light is extracted as the color tone effective pixel.

Figure 8A:
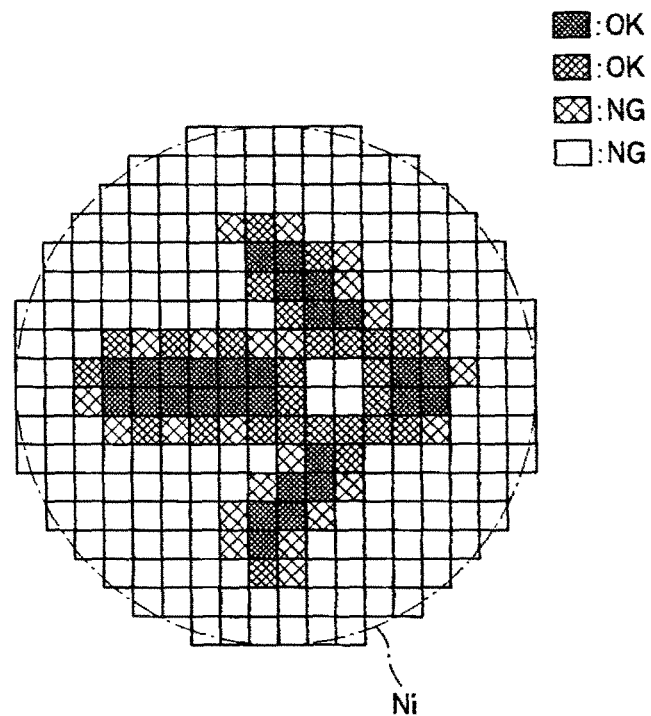
FIG. 8A is an illustration in which color tone effective pixels are extracted from an arrow signal search region.
Figure 8B:
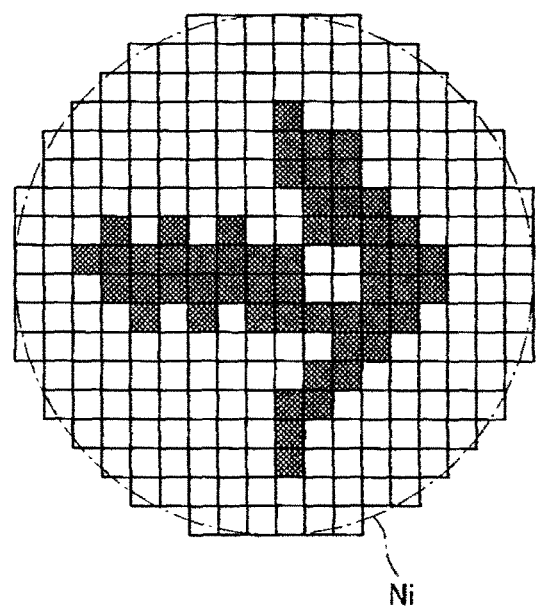
FIG. 8B is an illustration in which arrow effective pixels are extracted from color tone effective pixels.

A pixel satisfying the conditions (1) and (2) described above is extracted as the color tone effective pixel. For example, when the luminance information (RGB ratio) of respective pixels in the arrow signal area Ni set in the imaging surface and a threshold set in advance are compared for binarization into color tone effective pixels (OK) and ineffective pixels (NG) as shown in FIG. 8A, color tone effective pixels as shown in FIG. 8B are extracted.

Then, when the routine proceeds to step S5, a number (color tone effective pixel number) IOK of the color tone effective pixels extracted within the arrow signal area Ni is counted, and the routine proceeds to step S6. The processing in steps S4 and S5 correspond to processing by the color tone effective pixel searching module of the present invention.

In step S6, the color tone ineffective pixel is searched for in the respective color tone effective pixels extracted pixel by pixel in the arrow signal area Ni, based on pixel information of vicinity. That is, as described above, it is conceivable that a pixel assumed as the color tone effective pixel is a pixel that is actually unlit but extracted erroneously, due to low luminance or a blurry outline.

In the case where one or both of conditions of (1) and (2) described below apply, the color tone effective pixel is set as a color tone ineffective pixel.
(1) In the case where a difference AG in G values of a pixel extracted as the color tone effective pixel and a pixel in the vicinity that is extracted as the color tone effective pixel is within a range set in advance, i.e., a large difference in the G values is absent, the pixel in the vicinity is set as a color tone ineffective pixel.
(2) In the case where a pixel extracted as the color tone effective pixel is neighbored by ineffective pixels (NG), the color tone effective pixel is set as a color tone ineffective pixel.

Specifically, regarding the condition shown in (1), the G value of the color tone effective pixel and the G value of the color tone effective pixel in the vicinity are compared, since the color of the arrow signal light is green and is most significant in the G value. In the case where a large difference in the G values is absent, the luminance is uniform throughout, and there is a possibility of an erroneous determination for an arrow signal. Therefore, such a pixel in the vicinity is set as a color tone ineffective pixel. For example, in the case where focus is on a pixel in the center as shown in FIG. 9A, difference (edge difference) between the G value of this pixel and the G value of pixels on the immediate right and below is almost absent, and it is presumed that the influence of the luminance of the color tone effective pixel in the center is merely causing a blur. Therefore, the pixels on the immediate right and below are set as a color tone ineffective pixel. For the G value of pixels on the immediate left and above, there is a difference with respect to the G value of the pixel in the center, and it is presumed that the influence of blur is absent. Therefore, the color tone effective pixel is left as is. Thus, in FIG. 9A, the pixels on the immediate right and below are color tone ineffective pixels, and the pixels on the immediate left and above are color tone effective pixels.

Regarding the condition of (2), the color tone effective pixels are usually detected consecutively to some extent. In the case where the surrounding pixels in the vicinity are ineffective pixels (NG), consecutiveness is lacking, and there is a high possibility that a color tone effective pixel is extracted erroneously. Therefore, such a pixel is set as a color tone ineffective pixel.

Then, when the routine proceeds to step S7, a number (color tone ineffective pixel number) ING of the color tone ineffective pixels set in step S6 described above is counted, and the routine proceeds to step S8. The processing in step S7 corresponds to processing by the color tone ineffective pixel searching module of the present invention.

In step S8, the arrow effective pixel number YOK is calculated from the difference between the color tone effective pixel number IOK and the color tone ineffective pixel number ING (YOK←IOK-ING), and the routine proceeds to step S9. The processing in step S8 corresponds to processing by the arrow effective pixel number calculating module of the present invention.

In step S9, an arrow effective pixel threshold SLY is obtained based on the signal light distance Ls. That is, in the case where the signal light distance Ls is large, the number of pixels for an image of the arrow signal light that is formed on the imaging surface is small, the signal light distance Ls decreases as the vehicle 1 approaches the red signal light 21*r*, and the arrow signal area Ni (where i equals 1 to 6) is set accordingly. Therefore, the arrow effective pixel threshold SLY for determining whether or not an arrow signal is lit is set to a larger value as the signal light distance Ls decreases.

In step S10, the arrow effective pixel number YOK and the arrow effective pixel threshold SLY are compared. In the case where it is determined that YOK>SLY, it is determined that an arrow pixel is present in the corresponding arrow signal area Ni, and the routine proceeds to step S11. In the case where YOK SLY, it is determined that an arrow pixel is absent, and it branches off to step S12. The processing in step S10 corresponds to processing by the arrow pixel determining module of the present invention.

In step S11, the arrow effective point PNiOK relating to the corresponding arrow signal area Ni is updated by incrementing the currently held arrow effective point PNiOK(n-1) (PNiOK←PNiOK(n-1)+1), and the routine proceeds to step S13. When the routine proceeds to step S12 from step S10, the arrow ineffective point PNiNG relating to the corresponding arrow signal area Ni is updated by incrementing the currently held arrow effective point PNiNG(n-1) (PNiNG←PNiNG(n-1)+1), and the routine proceeds to step S15. Thus, addition is performed for every flowchart, i.e., for every frame, in one of the respective points PNiOK and PNiNG described above. Note that (n-1) is a reference sign showing the value before update. The processing in step S11 and step S12 described later correspond to processing by the arrow point adding module of the present invention.

When the routine proceeds to step S13 from step S11, the arrow effective point PNiOK and an arrow effective threshold SLOK set in advance are compared. When the routine proceeds to step S15 from step S12, the arrow ineffective point PNiNG and an arrow ineffective threshold SLNG set in advance are compared. As described above, the respective points PNiOK and PNiNG are values of which one is added for every frame from when the traffic light 21 ahead is recognized by the onboard camera 2 mounted to the vehicle 1 and the arrow signal processing routine is started.

Thus, since the precision in recognizing lighting of an arrow signal light increases as the vehicle 1 approaches the traffic light 21, setting the respective thresholds SLOK and SLNG to a large value increases the precision of detection of the arrow signal light, but the time required for detection increases. Setting the thresholds to SLOK and SLNG a small value reduces the time required for detection, but the precision of detection decreases. Therefore in this example, values with which a certain extent of precision of detection can be obtained and the time required for detection does not increase are obtained from an experiment or the like and set as the thresholds SLOK and SLNG. In this example, setting is such that SLOK and SLNG approximately equal 15 to 20 in the case where the frame rate is 30 (fps).

In the case where it is determined in step S13 that PNiOK>SLOK, i.e., a lit arrow signal light is present in the corresponding arrow signal area Ni, the routine proceeds to step S14 to set the arrow signal light determination flag FNi (where i equals 1 to 6), and the routine proceeds to step S17. In the case where PNIOK≤SLOK, the threshold SLOK is not reached, and therefore it jumps to step S17.

In the case where it is determined in step S15 that PNiNG>SLNG, i.e., a lit arrow signal light is absent or an arrow signal light itself is absent in the corresponding arrow signal area Ni, the routine proceeds to step S16 so that both of the points PNiOK and PNiNG are cleared (PNiOK←0 and PNiNG←0), and the routine proceeds to step S17. Thus, in the case where the same traffic light 21 is recognized at the time of executing the next routine, detection of an arrow signal light is performed again for the corresponding traffic light 21. The processing in steps S13, S14, S15, and S16 correspond to processing by the arrow signal determining module of the present invention.

When the routine proceeds to step S17 from any one of steps S13 to S16, whether or not the value Ni of the arrow signal area Ni has reached N6, i.e., whether or not search of all of the arrow signal areas N1 to N6 (see FIG. 6) has ended, is checked. In the case where it has not yet ended (Ni≠N6), it returns to step S3, and search of the next arrow signal area N(i+1) is performed. In the case where search of all of the arrow signal areas Ni has ended (Ni=N6), the value of the arrow signal area Ni is cleared (Ni←N0) in step S18, and the routine proceeds to step S19.

In step S19, the value of the arrow signal light determination flag FNi of all of the arrow signal areas Ni (where i equals 1 to 6) is checked. In the case where at least one arrow signal light determination flag FNi is set, the routine proceeds to step S20 so that an arrow recognition flag FY is set (FY←1), and the routine is exited. In the case where an arrow signal light determination flag FNi is not set, it branches off to step S21 so that the arrow recognition flag FY is cleared (FY←), and the routine is exited.

By reading the value of the arrow recognition flag FY in a traffic light recognition device that recognizes the lit color (red yellow, or green) of a traffic light, for example, information on whether or not an arrow signal light is provided to the recognized traffic light can be obtained.

In this manner, in this example, the arrow signal areas N1 to N6 are set in the vicinity of and with reference to the red signal light 21*r* of the traffic light 21 of which an image is formed on the imaging surface provided to the imaging element of the onboard camera 2, the color tone effective pixel in the respective arrow signal areas N1 to N6 is extracted, the color tone ineffective pixel is then extracted based on pixel information of the vicinity of the extracted color tone effective pixel, and the arrow effective pixel number YOK is detected from the difference between the number of the extracted color tone effective pixels IOK and the number of color tone ineffective pixels ING. Therefore, whether or not an arrow signal is present in each arrow signal area Ni can be detected with high precision.

Further, in the case where the number YOK of the arrow effective pixels extracted for each arrow signal area Ni exceeds the arrow effective pixel threshold SLY set for each frame based on the signal light distance Ls, the arrow effective point PNiOK(n-1) is incremented and updated. In the case where the updated arrow effective point PNiOK exceeds the arrow effective threshold SLOK, it is determined that an arrow signal light is present. Therefore, an arrow signal light can be recognized accurately.

In the case where the arrow effective pixel number YOK is less than or equal to the arrow effective pixel threshold SLY, the arrow ineffective point PNiNG(n-1) is incremented and updated. In the case where the updated arrow ineffective point PNiNG exceeds the arrow ineffective threshold SLNG, the two points PNiOk and PNiNG are cleared, and detection of an arrow signal light is performed again. Therefore, the frequency of an erroneous detection is reduced, and a higher precision of detection of an arrow signal light can be obtained by the reperformance.

The present invention is not limited to the example described above. For example, setting the arrow signal light determination flag FNi in step S14 is performed for each arrow signal area Ni (where i equals 1 to 6). Therefore, it is also possible to specify to which signal light an arrow signal light is adjacent, on the basis of the value of the arrow signal light determination flag FNi.

The invention claimed is:

1. An arrow signal recognition device comprising:
   an onboard camera that captures an image of a driving environment ahead of a vehicle equipped with the arrow signal recognition device;
   an image recognition processor that recognizes a lit signal light provided to a traffic light and calculates a signal light distance between the lit signal light and the vehicle, based on one frame of the image captured by the onboard camera; and
   an arrow signal detector that detects an arrow signal light provided to the traffic light,
   wherein the arrow signal detector includes:
      an arrow signal area setting module that sets an arrow signal area with reference to the lit signal light on the basis of the signal light distance;
      a color tone effective pixel searching module that searches for a color tone effective pixel assumed as being lit from color tones within an arrow signal area set by the arrow signal area setting module and counts the number of the color tone effective pixels;
      a color tone ineffective pixel searching module that compares each color tone effective pixel retrieved by the color tone effective pixel searching module and a pixel in a vicinity of the each color tone effective pixel, searches the color tone effective pixel for a color tone ineffective pixel, and counts the number of the color tone ineffective pixels;
      an arrow effective pixel number calculating module that calculates an arrow effective pixel number by subtracting the number of color tone ineffective pixels retrieved by the color tone ineffective pixel searching module from the number of color tone effective pixels retrieved by the color tone effective pixel searching module; and
      an arrow pixel determining module that determines an arrow pixel to be present in a case where the arrow effective pixel number calculated by the arrow effective pixel number calculating module exceeds an arrow effective pixel threshold set on the basis of the signal light distance.

2. The arrow signal recognition device according to claim 1, wherein the color tone effective pixel searching module assumes the color tone effective pixel in a case where a distance to the arrow signal light from the vehicle is identical to the signal light distance and a predetermined condition of an RGB ratio with reference to luminance information on an unlit signal light provided to the same traffic light is satisfied.

3. The arrow signal recognition device according to claim 2, wherein, in a case where a difference in G value between the color tone effective pixel and a color tone effective pixel in the vicinity of the color tone effective pixel falls under a narrow range set in advance, the color tone ineffective pixel searching module sets the color tone effective pixel in the vicinity to a color tone ineffective pixel.

4. The arrow signal recognition device according to claim 3, wherein the arrow signal detector further includes:
   an arrow point adding module that increments an arrow effective point updated at a time of computation for every frame in a case where the arrow pixel determining module has determined an arrow pixel to be present; and
   an arrow signal determining module that determines a lit arrow signal to be present in a case where the arrow effective point set by the arrow point adding module exceeds an arrow effective threshold set in advance.

5. The arrow signal recognition device according to claim 2, wherein, in a case where the color tone effective pixel is neighbored by an ineffective pixel, the color tone ineffective pixel searching module sets the color tone effective pixel to a color tone ineffective pixel.

6. The arrow signal recognition device according to claim 2, wherein the arrow signal detector further includes:
   an arrow point adding module that increments an arrow effective point updated at a time of computation for every frame in a case where the arrow pixel determining module has determined an arrow pixel to be present; and
   an arrow signal determining module that determines a lit arrow signal to be present in a case where the arrow effective point set by the arrow point adding module exceeds an arrow effective threshold set in advance.

7. The arrow signal recognition device according to claim 1, wherein, in a case where a difference in G value between the color tone effective pixel and a color tone effective pixel in the vicinity of the color tone effective pixel falls under a narrow range set in advance, the color tone ineffective pixel searching module sets the color tone effective pixel in the vicinity to a color tone ineffective pixel.

8. The arrow signal recognition device according to claim 7, wherein, in a case where the color tone effective pixel is neighbored by an ineffective pixel, the color tone ineffective pixel searching module sets the color tone effective pixel to a color tone ineffective pixel.

9. The arrow signal recognition device according to claim 7, wherein the arrow signal detector further includes:
   an arrow point adding module that increments an arrow effective point updated at a time of computation for every frame in a case where the arrow pixel determining module has determined an arrow pixel to be present; and
   an arrow signal determining module that determines a lit arrow signal to be present in a case where the arrow effective point set by the arrow point adding module exceeds an arrow effective threshold set in advance.

10. The arrow signal recognition device according to claim 1, wherein, in a case where the color tone effective pixel is neighbored by an ineffective pixel, the color tone ineffective pixel searching module sets the color tone effective pixel to a color tone ineffective pixel.

11. The arrow signal recognition device according to claim 1, wherein the arrow signal detector further includes:
   an arrow point adding module that increments an arrow effective point updated at a time of computation for every frame in a case where the arrow pixel determining module has determined an arrow pixel to be present; and
   an arrow signal determining module that determines a lit arrow signal to be present in a case where the arrow effective point set by the arrow point adding module exceeds an arrow effective threshold set in advance.

* * * * *